United States Patent
Motta

(10) Patent No.: US 9,071,765 B2
(45) Date of Patent: Jun. 30, 2015

(54) SYSTEM, METHOD, AND COMPUTER PROGRAM PRODUCT IMPLEMENTING AN IMAGE PROCESSING PIPELINE FOR HIGH-DYNAMIC RANGE IMAGES

(71) Applicant: NVIDIA Corporation, Santa Clara, CA (US)

(72) Inventor: Ricardo Jansson Motta, Palo Alto, CA (US)

(73) Assignee: NVIDIA Corporation, Santa Clara, CA (US)

( * ) Notice: Subject to any disclaimer, the term of this patent is extended or adjusted under 35 U.S.C. 154(b) by 75 days.

(21) Appl. No.: 13/730,639

(22) Filed: Dec. 28, 2012

(65) Prior Publication Data

US 2014/0184894 A1   Jul. 3, 2014

(51) Int. Cl.
*H04N 5/235*  (2006.01)
*H04N 5/355*  (2011.01)
*H04N 9/04*  (2006.01)

(52) U.S. Cl.
CPC ........... *H04N 5/2355* (2013.01); *H04N 5/2353* (2013.01); *H04N 5/35554* (2013.01); *H04N 9/045* (2013.01)

(58) Field of Classification Search
CPC .......... H04N 5/35554; H04N 5/35572; H04N 5/2355; H04N 5/2353
USPC .......... 348/229.1, 222.1, 218.1, 239
See application file for complete search history.

(56) References Cited

U.S. PATENT DOCUMENTS

| | | | |
|---|---|---|---|
| 7,483,058 B1 * | 1/2009 | Frank et al. | 348/222.1 |
| 2008/0219585 A1 * | 9/2008 | Kasai et al. | 382/274 |
| 2009/0262215 A1 * | 10/2009 | Sano et al. | 348/229.1 |
| 2012/0262600 A1 * | 10/2012 | Velarde et al. | 348/223.1 |
| 2013/0033622 A1 * | 2/2013 | Li | 348/241 |

* cited by examiner

*Primary Examiner* — Nhan T Tran
*Assistant Examiner* — Chan Nguyen
(74) *Attorney, Agent, or Firm* — Zilka-Kotab, PC

(57) ABSTRACT

A system, method, and computer program product for generating high-dynamic range image data is disclosed. The method includes the steps of receiving image sensor data from an interleaved image sensor. The interleaved the image sensor includes a first portion of pixels exposed for a first exposure time and a second portion of pixels exposed for a second exposure time that is shorter than the first exposure time. The method further includes the steps of identifying a first subset of pixels in the second portion having an intensity value above a first threshold value, identifying a second subset of pixels in the first portion having an intensity value below a second threshold value, and generating high-dynamic range (HDR) data based on the first subset and the second subset.

19 Claims, 9 Drawing Sheets

SYSTEM, METHOD, AND COMPUTER PROGRAM PRODUCT IMPLEMENTING AN IMAGE PROCESSING PIPELINE FOR HIGH-DYNAMIC RANGE IMAGES

FIELD OF THE INVENTION

The present invention relates to image processing, and more particular any to an image processing pipeline coupled to an image sensor.

BACKGROUND

Digital photographs may be captured today using a variety of image sensors (e.g., CMOS (complementary metal-oxide semiconductor) image sensors and CCD (charge coupled device) image sensors. Camera functionality is commonly included in today's mobile devices. For example, many cellular telephones such as the Apple® iPhone and the Motorola® Droid include an integrated image sensor that a user may use to capture digital images for transmission or storing on the mobile device. Design of these compact camera system is complicated by the fact that some scenes may exhibit a large degree of contrast (i.e., difference in the degree of intensity between pixels). In other words, within a single scene, some areas of the scene may be well-lit while other areas of the scene are masked in shadow. For example, when a user takes a picture outdoors, the scene may contain some objects in direct sunlight and other objects that are shielded from the sun.

CMOS image sensors used in mobile devices have a limited dynamic range. Each pixel site in the CMOS image sensor functions like a capacitor, capturing photons focused on the image sensor by a lens during an exposure and building up a charge. The amount of charge developed at a particular pixel site is dependent on the well-capacity of the pixel sensor. For example, CMOS pixels approximately 1.4 µm in size have a well-capacity of approximately 5000 electrons. Once the pixel site has built up a charge equivalent to 5000 electrons, the pixel site is incapable of capturing any further information about the brightness of the scene. The upper limit of the dynamic range is governed by the well capacity, and the discrete nature of light. Shot-noise limits the highest signal-to-noise ratio (SNR) of the sensor to the square root of the maximum signal, or about 36 dB in our 5000 electron example. The lower limit of the dynamic range is governed by read noise and quantization. Even in the absence of read-noise, the charge on the pixel is sampled to a discrete digital value; e.g., a 10-bit value. The charge for a pixel may be digitized using a 10-bit ADC (analog-to-digital converter) to generate a value between 0 and 1023.

As described above, the image sensor is only capable of measuring a limited dynamic range of light. Thus, the information captured by the image sensor is dependent on the exposure time. Using a fast exposure time may prevent bright areas of the scene from saturating the corresponding pixel sites. However, detailed information in darker areas of the scene may be lost because the signal in these areas is weak. Conversely, by extending the exposure time, details in the darker areas of the scene may become visible, but the brighter areas of the scene may become overexposed.

One technique for generating images with high-dynamic range (HDR) is to capture two images of the same scene using different exposure times. Conventionally, a first image is captured with one exposure time and then a second image is captured with a second exposure time. Once the images are captured, an image processing pipeline combines the two images to generate a scene with a dynamic range that is larger than the image sensor is capable of capturing during a single exposure. Recently, interleaved image sensors have been developed that capture two images with different exposure times substantially simultaneously. In effect, the interleaved image sensor captures one image of the scene using two different but simultaneous exposure times interleaved throughout the image sensor.

Some image processing algorithms for generating images using interleaved image sensors sacrifice spatial resolution to generate HDR images. For example, a first image may be generated using half the pixels and a second image may be generated using the other half of the pixels. The first image and the second image are then blended to generate an HDR image at half the vertical resolution. Thus, there is a need for addressing this issue and/or other issues associated with the prior art.

SUMMARY

A system, method, circuit design and computer program product for generating high-dynamic range image data is disclosed. The method includes the steps of receiving image sensor data from an interleaved image sensor. The interleaved the image sensor includes a first portion of pixels exposed for a first exposure time and a second portion of pixels exposed for a second exposure time that is shorter than the first exposure time. The method may further include the steps of identifying a first subset of pixels in the second portion having an intensity value above a first threshold value, identifying a second subset of pixels in the first portion having an intensity value below a second threshold value, and generating high-dynamic range (HDR) data based on the first subset and the second subset.

DETAILED DESCRIPTION

An image processing pipeline for use with an interleaved image sensor is described more fully below. The image processing pipeline includes a pre-processing engine that transforms the image sensor data received from the interleaved image sensor into HDR data that is companded (compressed-expanded) and then transmitted to a conventional image signal processor (ISP) for further processing. The conventional ISP implements various functions such as noise reduction, lens-shading correction, demosaicing, color space conversion, gamma correction, chroma sub-sampling, encoding, and so forth. The image processing pipeline may be implemented in software, hardware, or combinations thereof. In one embodiment, the image processing pipeline may be implemented as a hardware engine included in a system-on-chip (SoC) such as an NVIDIA® Tegra application processor. In another embodiment, the image processing pipeline may be implemented in software executed by a processing unit such as a central processing unit (CPU). In yet another embodiment, the image processing pipeline may be implemented in software executed by a highly parallel processing architecture such as a graphics processing unit (GPU).

Figure 1:
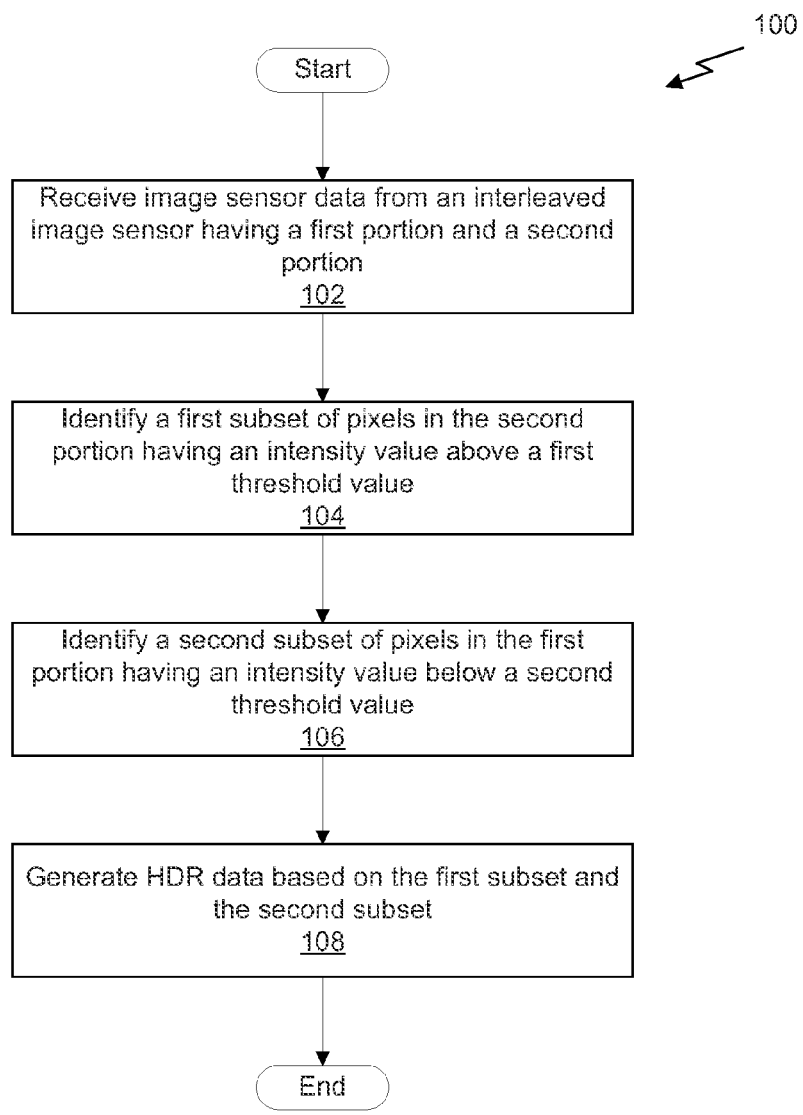
FIG. 1 illustrates a flowchart of a method for generating images, in accordance with one embodiment.

FIG. 1 illustrates a flowchart of a method 100 for generating HDR images, in accordance with one embodiment. At step 102, a pre-processing engine receives image sensor data from an interleaved image sensor. The image sensor data includes a first portion of pixels exposed for a first exposure time and a second portion of pixels exposed for a second exposure time. The first exposure time is greater than the second exposure time. At step 104, the pre-processing engine identifies a first subset of pixels in the second portion having an intensity value above a first threshold value. The first subset of pixels represents pixels in the second portion that have neighboring pixels in the first portion that may be invalid. In one embodiment, the pre-processing engine generates a mask that includes a value (e.g., 0 or 1) that identifies whether the corresponding pixel is included in the first subset. At step 106, the pre-processing engine identifies a second subset of pixels in the first portion having an intensity value below a second threshold value. The second subset of pixels represents pixels in the first portion that have neighboring pixels in the second portion that may be invalid. Again, in one embodiment, the pre-processing engine generates a mask that includes a value (e.g., 0 or 1) that identifies whether the corresponding pixel is included in the second subset. At step 108, the pre-processing engine generates HDR data based on the first subset and the second subset. It should be noted that, while various optional features are set forth herein in connection with the method for generating HDR images set forth above, such features are for illustrative purposes only and should not be construed as limiting in any manner.

Figure 2A:
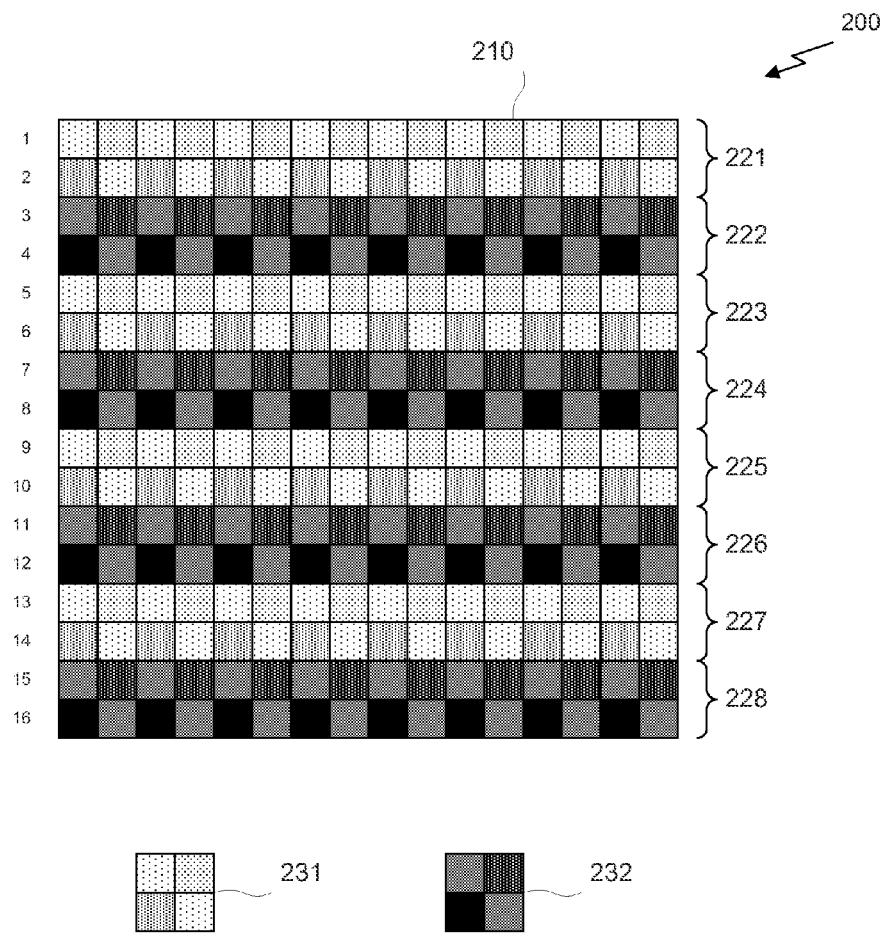
FIG. 2A illustrates an interleaved image sensor, in accordance with one embodiment.

FIG. 2A illustrates an interleaved image sensor 200, in accordance with one embodiment. The image sensor 200 includes a plurality of pixels 210 arranged in a two-dimensional (2D) array. In one embodiment, the image sensor 200 includes a color filter array (CFA) overlaid on the plurality of pixels 210. The CFA may be configured such that a first subset of pixels is associated with a first color filter, a second subset of pixels is associated with a second color filter, and a third subset of pixels is associated with a third color filter. For example, a Bayer pattern CFA implements a recurring 2×2 pattern of red, green, and blue color filters, with each 2×2 array of pixels overlaid with two green color filters, one red color filter, and one blue color filter. As shown in FIG. 2A, the first row of pixels alternates green and blue color filters and the second row of pixels alternates red and green color filters, the third row of pixels alternates green and blue color filters and the fourth row of pixels alternates red and green color filters, and so forth. Each pair of rows is referred to herein as a quad row (e.g., a first quad row 221, a second quad row 222, etc.). In other embodiments, different CFAs may be implemented as part of the interleaved image sensor 200 such as RGBE, RGBW, or CYGM CFAs.

Unlike a conventional CMOS image sensor, image sensor 200 is an interleaved image sensor. With a conventional CMOS image sensor, the rows of the image sensor 200 are reset in sequential order. The image sensor is exposed to light for an exposure time, thereby building up a charge at each of the pixel sites. The charge built up at each pixel site is approximately proportional to the intensity of light striking the pixel site relative to each of the other pixel sites. Once the exposure time has elapsed, the rows of the image sensor are sampled in sequential order to generate an array of values that represent the intensity of light for each pixel in a digital image. In contrast, the interleaved image sensor 200 samples the pixels based on multiple exposure times. In one embodiment, the odd quad rows (i.e., 221, 223, 225, 227, etc.) of the image sensor 200 are reset in sequential order at a first reset time. Similarly, the even quad rows (i.e., 222, 224, 226, 228, etc.) of the image sensor 200 are reset in sequential order at a second reset time. The odd quad rows and even quad rows of the image sensor 200 are read at a sampling time. The difference between the sampling time and the first reset time is equal to a first exposure time and the difference between the sampling time and the second reset time is equal to a second exposure time that is less than the first exposure time. Consequently, the pixels 210 included in the odd quad rows comprise a first portion 231 of the pixels 210 included in the image sensor 200, which correspond to a long exposure time, and the pixels 210 included in the even quad rows comprise a second portion 232 of the pixels 210 included in the image sensor 200, which correspond to a short exposure time. The pixels in the first portion 231 capture more detailed information about the darker areas of the scene and the pixels in the second portion 232 contain more detailed information about the brighter areas of the scene. It will be appreciated that, in other embodiments, all of the pixels may be reset at a reset time, the pixels in the even quad rows may be read after a second exposure time has elapsed since the reset time, and the pixels in the odd quad rows may be read after a first exposure time has elapsed since the reset time, where the first exposure time is longer than the second exposure time.

Figure 2B:
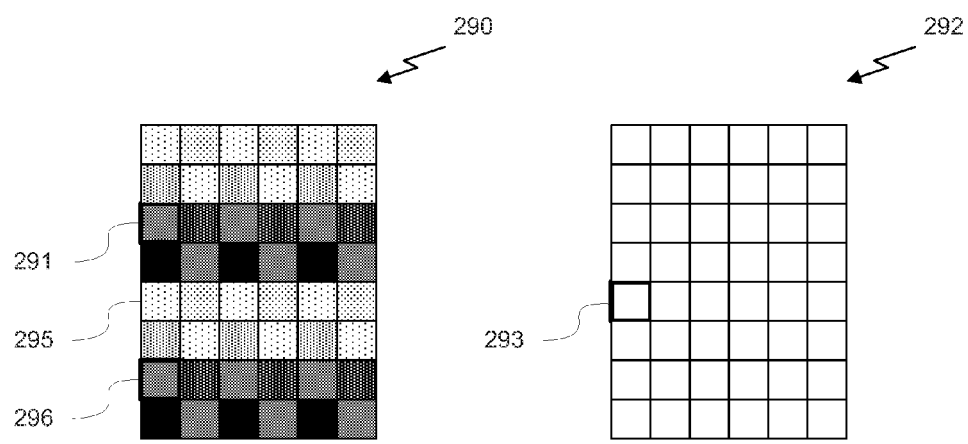
FIG. 2B illustrates the relationship between HDR data and image sensor data, in accordance with one embodiment.

FIG. 2B illustrates the relationship between HDR data 292 and image sensor data 290, in accordance with one embodiment. As described above, the interleaved image sensor 200 generates image sensor data 290 comprising a first portion 231 sampled from odd quad rows and a second portion 232 sampled from even quad rows, both having the same dynamic range. At certain locations in the image, neighboring pixels will capture light from the same object at different intensity levels corresponding to the different exposure times. For example, the first pixel in the third row of the image sensor (i.e., pixel 291) may capture a green object at an intensity level of 102 (out of 1023) due to the short exposure time of the even quad rows. However, the first pixel in the fifth row of the image sensor (i.e., pixel 295) may capture the same green object at an intensity level of approximately 816 (out of 1023) due to the long exposure time of odd quad rows. Given that both pixels are neither underexposed nor overexposed, the neighboring pixels capture details about the object at different spatial locations, but at different levels of intensity related to the exposure ratio.

The pre-processing engine intelligently samples and filters values from the raw image sensor data in order to generate the HDR data 292, which is a combination of values from the first portion 231, scaled values from the second portion 232, filtered values based on one or more sample values in the first portion 231, and filtered values based on one or more sample values in the second portion 232. For each pixel in the HDR data 292, the pre-processing engine generates an intensity value for the pixel based on an intensity value of a corresponding pixel in the image sensor data 290. If the corresponding pixel is included in the first portion 231, then the intensity value of the pixel in the HDR data 292 is set equal to the intensity value of the corresponding pixel. If the corresponding pixel is included in the second portion 232, then the intensity value of the pixel in the HDR data 292 is set equal to a scaled version of the intensity value of the corresponding pixel. In one embodiment, the intensity value of the corresponding pixel in the second portion 232 is scaled by the exposure ratio (i.e., the ratio of the first exposure time to the second exposure time). It will be appreciated that scaling by the exposure ratio may require additional bits in the HDR data 292. For example, for an exposure ratio of 8, an additional 3 bits are needed to scale the intensity values of the second portion 232 by 8.

In another embodiment, instead of scaling the intensity value of corresponding pixels in the second portion 232 by the exposure ratio, the pre-processing engine scales intensity values of corresponding pixels in the first portion 231 by the inverse of the exposure ratio. In such an embodiment, the HDR data 292 has the same bit-depth as the image sensor data 290. While, some information may be lost by scaling the values down rather than scaling values up, an additional step of reducing the bit-depth of the HDR data 292 (e.g., via companding) is not required in order to process the HDR data 292 by a conventional ISP.

The HDR data 292 may include some invalid values. For example, a pixel 293 in the HDR data 292 has an index associated with a corresponding pixel 295 in the image sensor data 290. The pre-processing engine may determine whether the value for corresponding pixel 295 in the first portion 231 is valid based on a neighboring pixel 296 in the second portion 232. If the intensity level of a neighboring pixel 296, in the second portion 232, is above a threshold level, $t_2$, which indicates that pixel 295 may be invalid as overexposed, then the pre-processing engine may determine a new value for the pixel based on one or more neighboring pixels within the second portion. In one embodiment, the threshold $t_2$ is set equal to a maximum threshold $t_1$ multiplied by the inverse of the exposure ratio (i.e., $t_2=t_1/r_x=1023/8=128$). It will be appreciated that an intensity value for a pixel in the second portion 232, which represent values based on a short exposure time, may be located near neighboring pixels in the first portion that have intensity values that are approximately equal to the intensity level for the pixel in the second portion 232 multiplied by the exposure ratio. Because $t_2$ multiplied by the exposure ratio is equal to the maximum intensity level of the image sensor 200, neighboring pixels in the first portion 231 captured using a longer exposure time may have saturated the image sensor 200. Similarly neighboring pixels in the second portion 232 captured using a shorter exposure time may be underexposed when pixels in the first portion 231 are below a different threshold value (such as a minimum threshold $t_0$ multiplied by the exposure ratio).

To correct for overexposed pixels in the first portion 231, the pre-processing engine identifies neighboring pixels in the second portion 232 that have intensity values above a first threshold value. To correct for underexposed pixels in the second portion 232, the pre-processing engine identifies neighboring pixels in the first portion 231 that have intensity values below a second threshold value. Then, for each pixel in the HDR data 292, the pre-processing engine determines whether a neighboring pixel of the corresponding pixel in the image sensor data 290 is above the first threshold value or below the second threshold value. In other words, the pre-processing engine determines whether a neighboring pixel of the corresponding pixel is included in the first subset or the second subset. If the neighboring pixel is included in the first subset, then a new value for the pixel in the HDR data 292 is generated by filtering one or more values from neighboring pixels in the second portion 232 and scaling the filtered value by the exposure ratio. If the neighboring pixel is included in the second subset, then a new value for the pixel in the HDR data 292 is generated by filtering one or more values from neighboring pixels in the first portion 231.

It will be appreciated that the resulting HDR data comprises areas of the scene at low resolution meshed with areas of the scene at high resolution. Low resolution areas are those areas comprising filtered results because at least some of the pixels in the area were underexposed or overexposed in one of the exposures. High resolution areas are those areas comprising results calculated from pixels that were neither under exposed nor overexposed during both exposures. It will be appreciated that the pixels in the image sensor data 292 can be classified as part of three distinct groups: a first group that includes pixels that have neighboring pixels in the first subset, which indicates that a pixel of the HDR data 292 is generated by filtering one or more values from the second portion 232; a second group that includes pixels that have neighboring pixels in the second subset, which indicates that a pixel of the HDR data 292 is generated by filtering one or more values from the first portion 231; and a third group that includes pixels that have neighboring pixels that aren't in the first subset or the second subset, which indicates that a pixel of the HDR data 292 is generated by either scaling a pixel in the second portion 232 or selecting a value from the first portion 231.

In another embodiment, the pre-processing engine may identify a third subset of pixels in the second portion 232 that is above a third threshold value but below the first threshold value. The third subset indicates neighboring pixels in the second portion 232 that may be near pixels that are close to overexposed. The pre-processing engine may also identify a fourth subset of pixels in the first portion 231 that is below a fourth threshold value but above the second threshold value. The fourth subset indicates neighboring pixels in the first portion 231 that may be near pixels that are close to underexposed. The pre-processing engine determines whether a neighboring pixel of the corresponding pixel is included in the third subset or the fourth subset. If the neighboring pixel is included in the third subset, then a new value for the pixel in the HDR data 292 is generated by filtering one or more values from neighboring pixels in the second portion 232 and scaling the filtered value by the exposure ratio to generate a first intermediate result. The pre-processing engine then blends the first intermediate result with the intensity value of the corresponding pixel in the first portion 231. In one embodiment, the blending comprises a linear interpolation between the first intermediate result and the intensity value of the corresponding pixel based on the intensity value of the neighboring pixel. Similarly, if the neighboring pixel is included in the fourth subset, then a new value for the pixel in the HDR data 292 is generated by filtering one or more values from neighboring pixels in the first portion 231 to generate a first intermediate result. The pre-processing engine then blends the first intermediate result with a scaled version of the intensity value of the corresponding pixel in the second portion 232.

It will be appreciated that the pixels in the image sensor data 290, for such an embodiment, can be classified as part of five distinct groups: a first group that includes pixels that have neighboring pixels in the first subset, which indicates that a pixel of the HDR data 292 is generated by filtering one or more values from the second portion 232; a second group that includes pixels that have neighboring pixels in the second subset, which indicates that a pixel of the HDR data 292 is generated by filtering one or more values from the first portion 231; a third group that includes pixels that have neighboring pixels in the third subset, which indicates that a pixel of the HDR data 292 is generated by blending a scaled and filtered value from the second portion 232 and a value from the first portion 231; a fourth group that includes pixels that have neighboring pixels in the fourth subset, which indicates that a pixel of the HDR data 292 is generated by blending a filtered value from the first portion 231 and a scaled value from the second portion 232; and a fifth group that includes pixels that have neighboring pixels that aren't in the first subset, second subset, third subset, or fourth subset, which indicates that a pixel of the HDR data 292 is generated by either scaling a pixel in the second portion 232 or selecting a value from the first portion 231.

Figure 3:
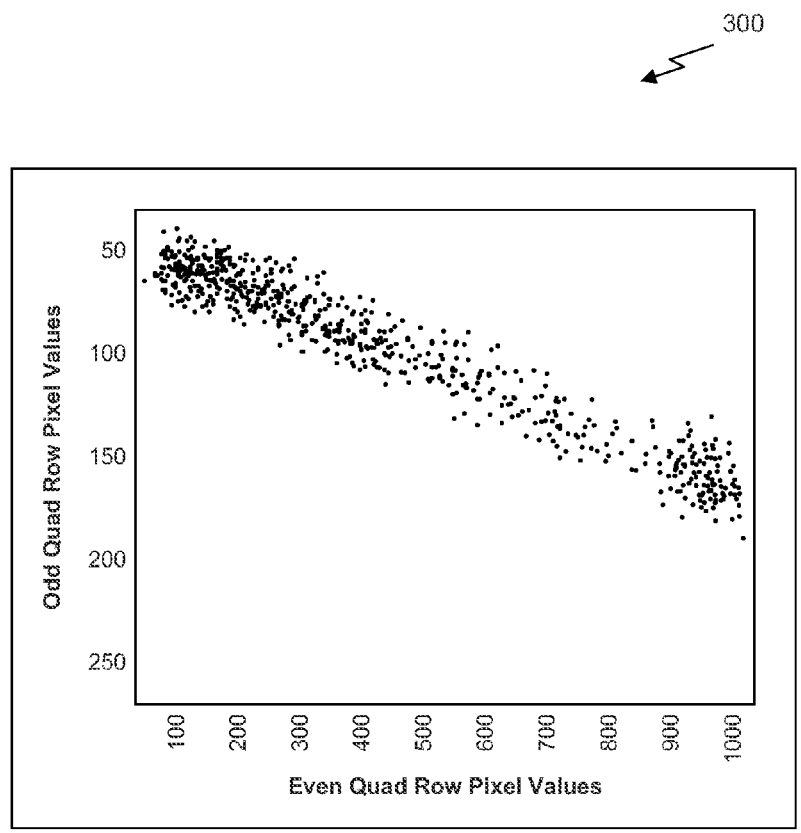
FIG. 3 is a scatterplot that illustrates the relationship between pixels in odd quad rows and pixels in even quad rows of the interleaved image sensor, in accordance with one embodiment.

FIG. 3 is a scatterplot 300 that illustrates the relationship between pixels in odd quad rows and pixels in even quad rows of the interleaved image sensor 200, in accordance with one embodiment. As described above, pixels in odd quad rows (e.g., 221, 223, 225, 227, etc.) are associated with a first exposure time and pixels in even quad rows (e.g., 222, 224, 226, 228, etc.) are associated with a second exposure time. The scatterplot 300 relates the intensity level of pixels of a particular channel with adjacent pixels associated with the same channel (i.e., the same color). A different scatterplot 300 may be plotted for each channel in the CFA of the interleaved image sensor 200.

As shown in FIG. 3, the scatterplot 300 illustrates an exposure ratio ($r_x$) of approximately 8 (i.e., the first exposure time is approximately 8 times longer than the second exposure time). The relationship between the intensity level of neighboring pixels is approximately linear (i.e., y=ax+b). For example, as shown in the scatterplot 300 of FIG. 3, the slope of a line fit to the sample points in the scatterplot 300 is approximately equal to the exposure ratio. In scatterplot 300, the minimum intensity level is approximately 45 and the maximum intensity level is approximately 1023. Furthermore, an intensity value above approximately 167 (i.e., 45+(1023−45)/$r_x$) in an even quad row (i.e., the second portion 232) indicates that there is likely an overexposed pixel in an adjacent odd quad row (i.e., the first portion 231), and an intensity value below approximately 360 (i.e., 45*$r_x$) in an odd quad row (i.e., the first portion 231) indicates that there is likely an underexposed pixel in an adjacent even quad row (i.e. the second portion 232) for a similar object.

In one embodiment, the relationship between intensity values for pixels in odd quad rows and neighboring pixels in even quad rows, as plotted in scatterplot 300, may be used to define an exposure ratio for the interleaved image sensor 200. The image sensor 200 may be calibrated during manufacture by capturing images of scenes with standard lighting. For example, a digital camera with the image sensor 200 may be placed in a light box and exposed to an evenly lit surface having different colors thereon. The image sensor 200 is exposed using two different exposure times for the odd quad rows and the even quad rows. Then, the values of various sample pixels are input to a linear regression algorithm to find an exposure ratio for the image sensor 200.

Figure 4:
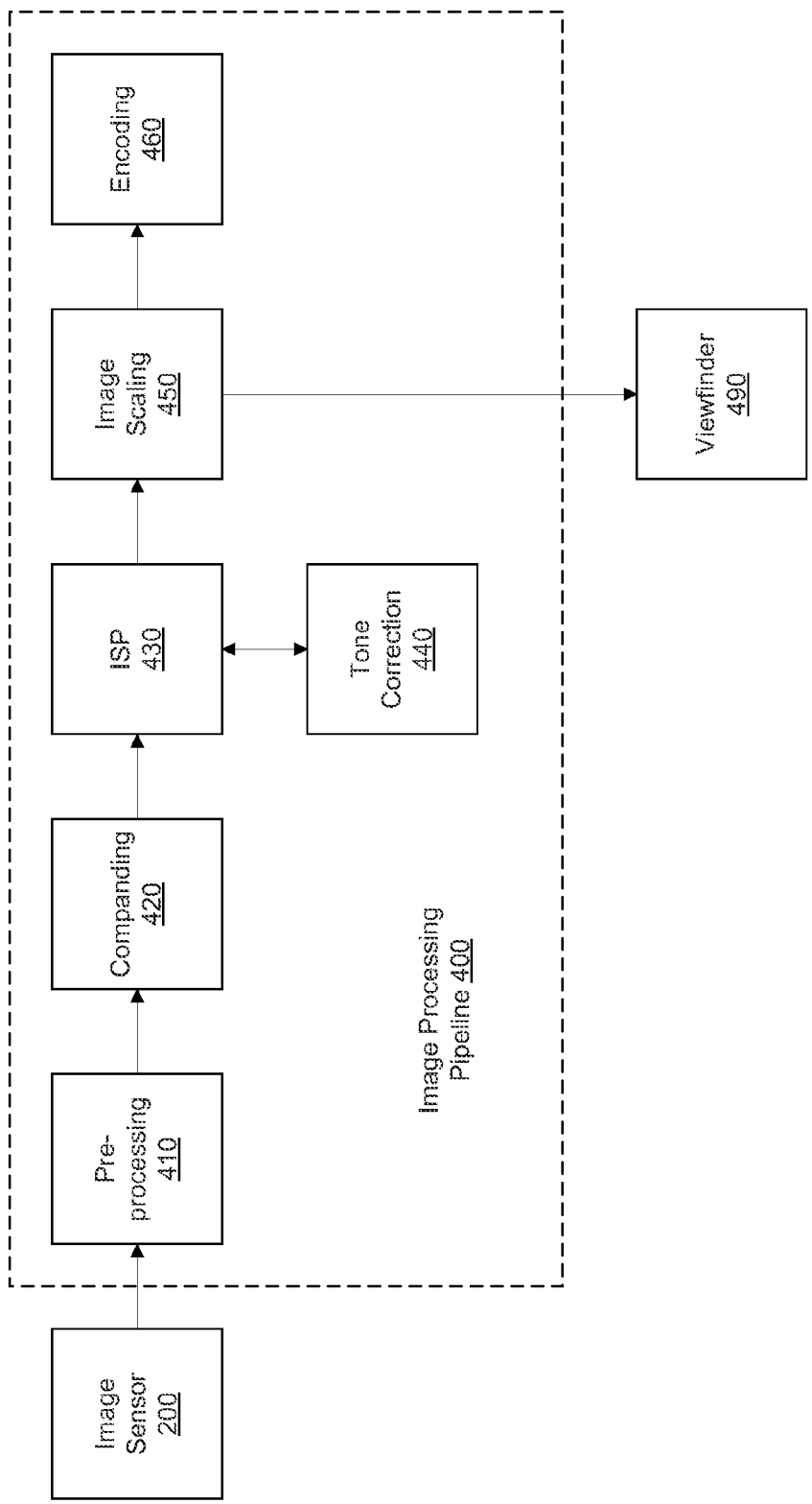
FIG. 4 illustrates an image processing pipeline coupled to the interleaved image sensor of FIG. 2, in accordance with one embodiment.

FIG. 4 illustrates an image processing pipeline 400 coupled to the interleaved image sensor 200 of FIG. 2, accordance with one embodiment. The image processing pipeline 400 includes a pre-processing engine 410, a companding engine 420, a conventional ISP 430, a tone correction engine 440, an image scaling engine 450, and an encoding engine 460. The interleaved image sensor 200 generates image sensor data sampled based on two different exposure times, a short exposure and a long exposure. The pre-processing engine 410 receives the image sensor data and generates HDR data, as described above.

In one embodiment, the image processing pipeline 400 includes a companding engine 420. The companding engine 420 reduces the amount of bits used per intensity value in the HDR data 292 in a non-linear manner such that a conventional ISP 430 may be implemented downstream to process the HDR data 292. In other words, more bits are used to distinguish between lower levels of the signal than bits that are used to distinguish between higher levels of the signal. Conceptually, the companding engine 420 is implemented so that a conventional ISP 430 may be used in the image processing pipeline 400. In other words, if the companding engine 420 were not implemented, then an ISP configured to process, e.g., 10-bit data could not operate on the HDR data 292 with the expanded, e.g., 13-bit dynamic range. Rather than scaling the HDR data back to the 10-bit dynamic range, which would cause a loss of information, the companding engine 420 is implemented to compress the HDR data 292 in a non-linear manner that avoids unnecessary loss of information. The companding engine 420 may scale the HDR data 292 down to the original LDR dynamic range for further processing by a conventional ISP 430. In another embodiment, the companding engine 420 is not included in the image processing pipeline 400 and ISP 430 is configured to process the HDR data 292 at the higher bitwidth.

The ISP 430 may implement a number of functions typically implemented in a conventional ISP. For example, the ISP 430 may implement functions for performing noise reduction, color conversion, gamma correction, and the like. Because the image processing pipeline 400 operates on data that has been compressed in a non-linear fashion via the companding engine 420, the image processing pipeline 400 may include a tone correction engine 440 that compensates for the non-linearity of the compression.

The image processing pipeline 400 also includes an image scaling engine 450, which may be connected to a viewfinder 490. The image scaling engine 450 can be configured to generate scaled versions of the HDR data at resolutions that are different than the full resolution of the image sensor 200. The viewfinder 490 may display the HDR image in real time. The image scaling engine 450 is also coupled an encoding engine 460, which is configured to encode the uncompressed image data for storage in a memory. The encoding engine 460 may implement any number of codecs for image compression known in the art, including the JPEG (Joint Picture Experts Group) codec.

Figure 5A:
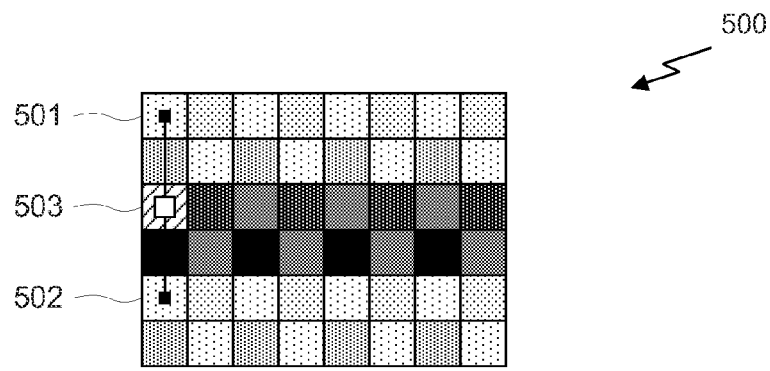
FIG. 5A illustrates a filter for generating pixel values for underexposed or overexposed pixels, in accordance with one embodiment.

FIG. 5A illustrates a filter 500 for generating pixel values for underexposed or overexposed pixels, in accordance with one embodiment. When pre-processing engine 410 determines that a corresponding pixel 501 in the image sensor data 290 is included in the first portion 231, the pre-processing engine 410 checks a neighboring pixel 503 to determine whether the neighboring pixel 503 is included in the first subset (i.e., has an intensity value above a threshold value). If the neighboring pixel 503 is included in the first subset, then an intensity value for the pixel in the HDR data 292 is generated by filtering one or more values in the second portion 232. In one embodiment, because corresponding pixel 501 is located in the first odd quad row of the image sensor 200, the filtered value will be based on a single sample in the second portion 232, e.g., pixel 503.

Similarly, as shown in FIG. 5A, when pre-processing engine 410 determines that a corresponding pixel 503 in the image sensor data 290 is included in the second portion 232, the pre-processing engine 410 checks a neighboring pixel 501 to determine whether the neighboring pixel 501 is included in the second subset (i.e., has an intensity value below a threshold value). If the neighboring pixel 501 is included in the second subset, then the pre-processing engine generates an intensity value for the pixel in the HDR data 292 by filtering one or more values in the first portion 231. In one embodiment, the pre-processing engine 410 implements a filter 500 by interpolating between two sample values for neighboring pixels in quad rows directly above and below the corresponding pixel 503. For example, for a pixel in the HDR data 292 corresponding with pixel 503, pre-processing engine 410 would check to determine whether neighboring pixel 501 is below a threshold value. If the intensity value for pixel 501 is below the threshold value, then the pre-processing engine 410 generates an intensity value for the pixel based on an interpolation between pixel 501 and pixel 502.

Figure 5B:
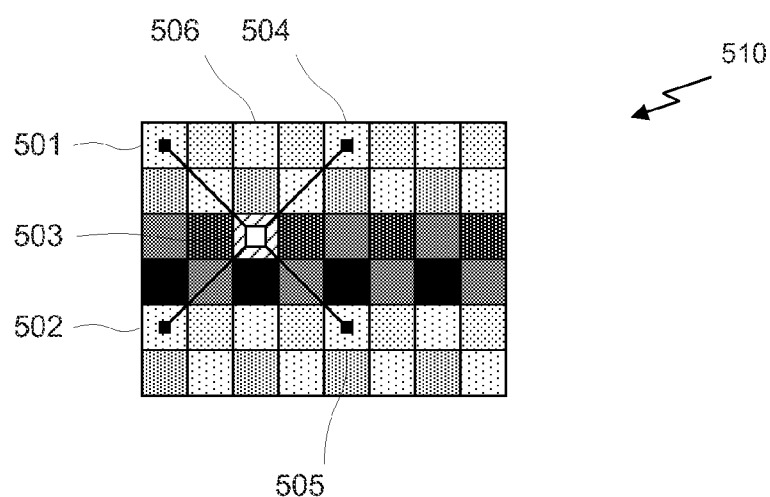
FIG. 5B illustrates a filter for generating pixel values for underexposed or overexposed pixels, in accordance with another embodiment.

FIG. 5B illustrates a filter 510 for generating pixel values for underexposed or overexposed pixels, in accordance with another embodiment. Unlike the filter 500, shown in FIG. 5A, filter 510 samples more than two values in adjacent quad rows to generate the intensity value for the pixel. As shown in FIG. 5B, for a corresponding pixel 503, when the pre-processing engine determines that a neighboring pixel 506 is included in the second subset, then the pre-processing engine generates an intensity value for the corresponding pixel 503 in the HDR data 292 by filtering four neighboring pixels (e.g., 501, 502, 504, and 505) in adjacent quad rows. The intensity value is generated by sampling the intensity value of the four neighboring pixels and taking an average of the four values. It will be appreciated that other types of filters may be applied to generate intensity value for pixels that have neighboring pixels in the first subset or the second subset. For example, a filter that implements a Gaussian convolution kernel may be implemented that samples a plurality of intensity values from pixels within a filter window surrounding the corresponding pixel. In yet another embodiment, a filter may select the nearest neighboring pixel in the quad row directly above or below the corresponding pixel.

Again, the image processing pipeline 400 described above, and specifically the pre-processing engine 410, may be implemented in software, hardware, or combinations thereof. In one embodiment, portions of the image processing pipeline 400 may be implemented as a shader program configured to execute on a parallel processing unit such as a GPU. An exemplary parallel processing unit is set forth below. In one embodiment, the GPU is a general purpose graphics processing unit (GPGPU) that is configured to perform calculations traditionally performed by a CPU. Although the parallel processing unit of FIG. 6 is described along with a number of features, such features are set forth for illustrative purposes only and should not be construed as limiting in any manner.

Figure 6:
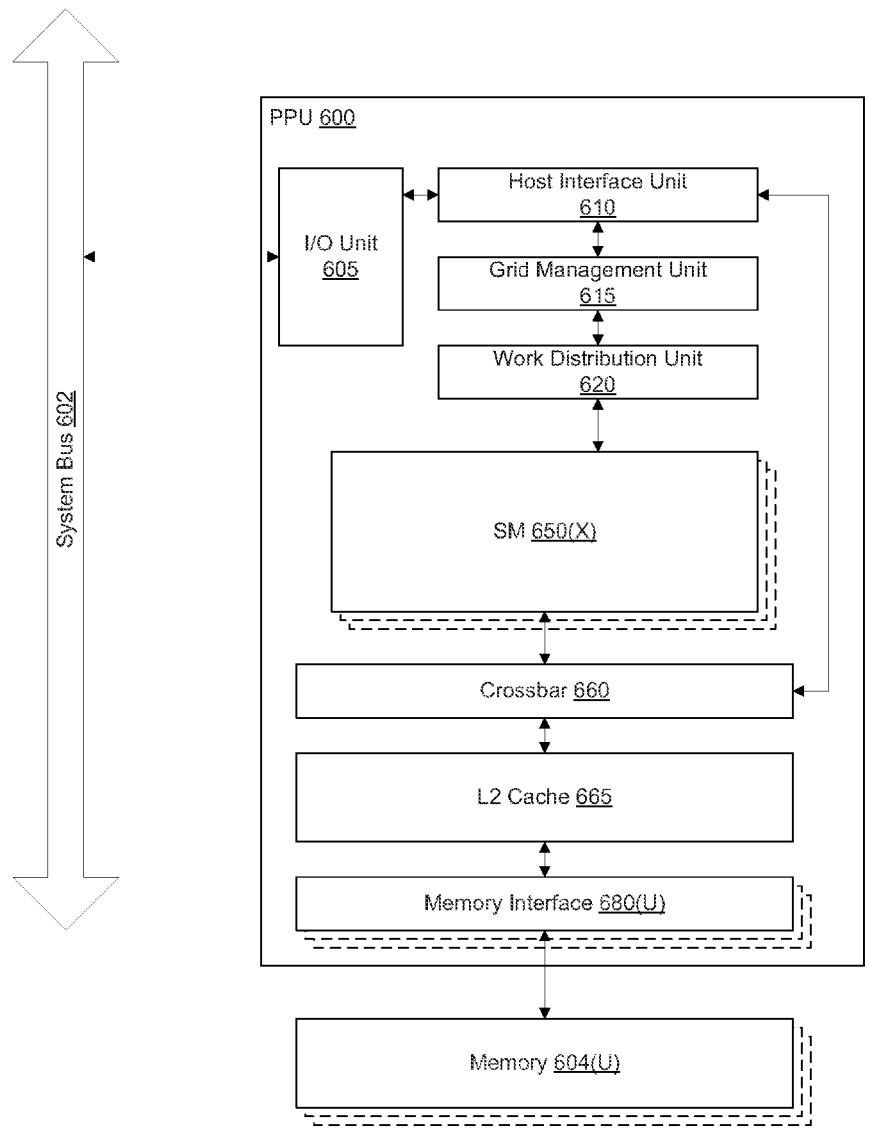
FIG. 6 illustrates a parallel processing unit, according to one embodiment.

FIG. 6 illustrates a parallel processing unit (PPU) 600, according to one embodiment. While a parallel processor is provided herein as an example of the PPU 600, it should be strongly noted that such processor is set forth for illustrative purposes only, and any processor may be employed to supplement and/or substitute for the same. In one embodiment, the PPU 600 is configured to execute a plurality of threads concurrently in two or more streaming multi-processors (SMs) 650. A thread (i.e., a thread of execution) is an instantiation of a set of instructions executing within a particular SM 650. Each SM 650, described below in more detail in conjunction with FIG. 7, may include, but is not limited to, one or more processing cores, one or more load/store units (LSUs), a level-one (L1) cache, shared memory, and the like.

In one embodiment, the PPU 600 includes an input/output (I/O) unit 605 configured to transmit and receive communications (i.e., commands, data, etc.) from a central processing unit (CPU) (not shown) over the system bus 602. The I/O unit 605 may implement a Peripheral Component interconnect Express (PCIe) interface for communications over a PCIe bus. In alternative embodiments, the I/O unit 605 may implement other types of well-known bus interfaces.

The PPU 600 also includes a host interface unit 610 that decodes the commands and transmits the commands to the grid management unit 615 or other units of the PPU 600 (e.g., memory interface 680) as the commands may specify. The host interface unit 610 is configured to route communications between and among the various logical units of the PPU 600.

In one embodiment, a program encoded as a command stream is written to a buffer by the CPU. The buffer is a region in memory, e.g., memory 604 or system memory, that is accessible (i.e., read/write) by both the CPU and the PPU 600. The CPU writes the command stream to the buffer and then transmits a pointer to the start of the command stream to the PPU 600. The host interface unit 610 provides the grid management unit (GMU) 615 with pointers to one or more streams. The GMU 615 selects one or more streams and is configured to organize the selected streams as a pool of pending grids. The pool of pending grids may include new grids that have not yet been selected for execution and grids that have been partially executed and have been suspended.

A work distribution unit 620 that is coupled between the GMU 615 and the SMs 650 manages a pool of active grids, selecting and dispatching active grids for execution by the SMs 650. Pending grids are transferred to the active grid pool by the GMU 615 when a pending grid is eligible to execute, i.e., has no unresolved data dependencies. An active grid is transferred to the pending pool when execution of the active grid is blocked by a dependency. When execution of a grid is completed, the grid is removed from the active grid pool by the work distribution unit 620. In addition to receiving grids from the host interface unit 610 and the work distribution unit 620, the GMU 610 also receives grids that are dynamically generated by the SMs 650 during execution of a grid. These dynamically generated grids join the other pending grids in the pending grid pool.

In one embodiment, the CPU executes a driver kernel that implements an application programming interface (API) that enables one or more applications executing on the CPU to schedule operations for execution on the PPU 600. An application may include instructions (i.e., API calls) that cause the driver kernel to generate one or more grids for execution. In one embodiment, the PPU 600 implements a SIMD (Single-Instruction, Multiple-Data) architecture where each thread block (i.e., warp) in a grid is concurrently executed on a different data set by different threads in the thread block. The driver kernel defines thread blocks that are comprised of k related threads, such that threads in the same thread block may exchange data through shared memory. In one embodiment, a thread block comprises 32 related threads and a grid is an array of one or more thread blocks that execute the same stream and the different thread blocks may exchange data through global memory.

In one embodiment, the PPU 600 comprises X SMs 650 (X). For example, the PPU 600 may include 15 distinct SMs 650. Each SM 650 is multi-threaded and configured to execute a plurality of threads (e.g., 32 threads) from a particular thread block concurrently. Each of the SMs 650 is connected to a level-two (L2) cache 665 via a crossbar 660 (or other type of interconnect network). The L2 cache 665 is connected to one or more memory interfaces 680. Memory interfaces 680 implement 16, 32, 64,128-bit data buses, or the like, for high-speed data transfer. In one embodiment, the PPU 600 comprises U memory interfaces 680(U), where each memory interface 680(U) is connected to a corresponding memory device 604(U). For example, PPU 600 may be connected to up to 6 memory devices 604, such as graphics double-data-rate, version 5, synchronous dynamic random access memory (GDDR5 SDRAM).

In one embodiment, the PPU 600 implements a multi-level memory hierarchy. The memory 604 is located off-chip in SDRAM coupled to the PPU 600. Data from the memory 604 may be fetched and stored in the L2 cache 665, which is located on-chip and is shared between the various SMs 650. In one embodiment, each of the SMs 650 also implements an L1 cache. The L1 cache is private memory that is dedicated to a particular SM 650. Each of the L1 caches is coupled to the shared L2 cache 665. Data from the L2 cache 665 may be fetched and stored in each of the L1 caches for processing in the functional units of the SMs 650.

In one embodiment, the PHI 600 comprises a graphics processing unit (GPU). The PPU 600 is configured to receive commands that specify shader programs for processing graphics data. Graphics data may be defined as a set of primitives such as points, lines, triangles, quads, triangle strips, and the like. Typically, a primitive includes data that specifies a number of vertices for the primitive (e.g., in a model-space coordinate system as well as attributes associated with each vertex of the primitive. The PPU 600 can be configured to process the graphics primitives to generate a frame buffer (i.e., pixel data for each of the pixels of the display). The driver kernel implements a graphics processing pipeline, such as the graphics processing pipeline defined by the OpenGL API.

An application writes model data for a scene (i.e., a collection of vertices and attributes) to memory. The model data defines each of the objects that may be visible on a display. The application then makes an API call to the driver kernel that requests the model data to be rendered and displayed. The driver kernel reads the model data and writes commands to the buffer to perform one or more operations to process the model data. The commands may encode different shader programs including one or more of a vertex shader, shader, geometry shader, pixel shader, etc. For example, the GMU 615 may configure one or more SMs 650 to execute a vertex shader program that processes a number of vertices defined by the model data. In one embodiment, the GMU 615 may configure different SMs 650 to execute different shader programs concurrently. For example, a first subset of SMs 650 may be configured to execute a vertex shader program while a second subset of SMs 650 may be configured to execute a pixel shader program. The first subset of SMs 650 processes vertex data to produce processed vertex data and writes the processed vertex data to the L2 cache 665 and/or the memory 604. After the processed vertex data is rasterized (i.e., transformed from three-dimensional data into two-dimensional data in screen space) to produce fragment data, the second subset of SMs 650 executes a pixel shader to produce processed fragment data, which is then blended with other processed fragment data and written to the frame buffer in memory 604. The vertex shader program and pixel shader program may execute concurrently, processing different data from the same scene in a pipelined fashion until all of the model data for the scene has been rendered to the frame buffer.

The PPU 600 may be included in a desktop computer, a laptop computer, a tablet computer, a smart-phone (e.g., a wireless, hand-held device), personal digital assistant (PDA), a digital camera, a hand-held electronic device, and the like. In one embodiment, the PPU 600 is embodied on a single semiconductor substrate. In another embodiment, the PPU 600 is included in a system-on-a-chip (SoC) along with one or more other logic units such as a reduced instruction set computer (RISC) CPU, a memory management unit (MMU), a digital-to-analog converter (DAC), and the like.

In one embodiment, the PPU 600 may be included on a graphics card that includes one or more memory devices 604 such as GDDR5 SDRAM. The graphics card may be configured to interface with a PCIe slot on a motherboard of a desktop computer that includes, e.g., a northbridge chipset and a southbridge chipset. In yet another embodiment, the PPU 600 may be an integrated graphics processing unit (iGPU) included in the chipset (i.e., Northbridge) of the motherboard.

Figure 7:
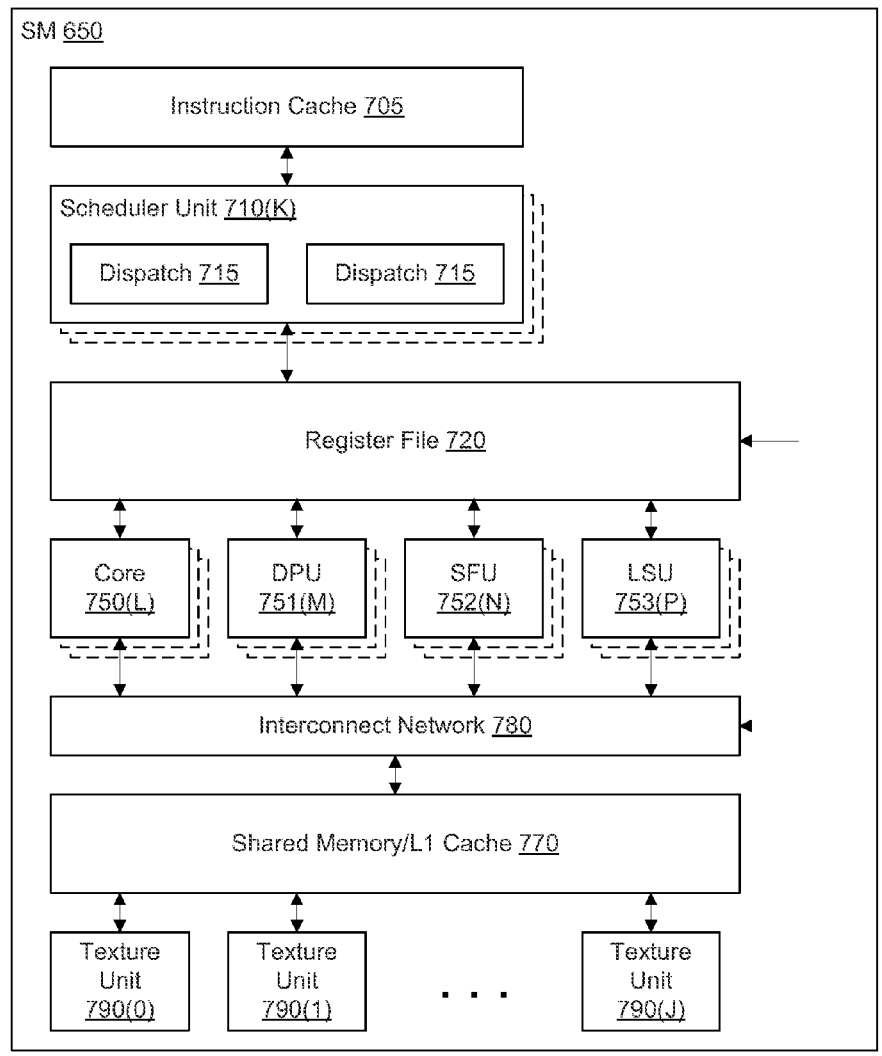
FIG. 7 illustrates the streaming multi-processor of FIG. 6, according to one embodiment.

FIG. 7 illustrates the streaming multi-processor 650 of FIG. 6, according to one embodiment. As shown in FIG. 7, the SM 650 includes an instruction cache 705, one or more scheduler units 710, a register file 720, one or more processing cores 750, one or more double precision units (DPUs) 751, one or more special function units (SFUs) 752, one or more load/store units (LSUs) 753, an interconnect network 780, a shared memory/L1 cache 770, and one or more texture units 790.

As described above, the work distribution unit 620 dispatches active grids for execution on one or more SMs 650 of the PPU 600. The scheduler unit 710 receives the grids from the work distribution unit 620 and manages instruction scheduling for one or more thread blocks of each active grid. The scheduler unit 710 schedules threads for execution in groups of parallel threads, where each group is called a warp. In one embodiment, each warp includes 32 threads. The scheduler unit 710 may manage a plurality of different thread blocks, allocating the thread blocks to warps for execution and then scheduling instructions from the plurality of different warps on the various functional units (i.e., cores 750, DPUs 751, SFUs 752, and LSUs 753) during each clock cycle.

In one embodiment, each scheduler unit 710 includes one or more instruction dispatch units 715. Each dispatch unit 715 is configured to transmit instructions to one or more of the functional units. In the embodiment shown in FIG. 7, the scheduler unit 710 includes two dispatch units 715 that enable two different instructions from the same warp to be dispatched during each clock cycle. In alternative embodiments, each scheduler unit 710 may include a single dispatch unit 715 or additional dispatch units 715.

Each SM 650 includes a register file 720 that provides a set of registers for the functional units of the SM 650. In one embodiment, the register file 720 is divided between each of the functional units such that each functional unit is allocated a dedicated portion of the register file 720. In another embodiment, the register file 720 is divided between the different warps being executed by the SM 650. The register file 720 provides temporary storage for operands connected to the data paths of the functional units.

Each SM 650 comprises L processing cores 750. In one embodiment, the SM 650 includes a large number (e.g., 192, etc.) of distinct processing cores 750. Each core 750 is a fully-pipelined, single-precision processing unit that includes a floating point arithmetic logic unit and an integer arithmetic logic unit. In one embodiment, the floating point arithmetic logic units implement the IEEE 754-2008 standard for floating point arithmetic. Each SM 650 also comprises M DPUs 751 that implement double-precision floating point arithmetic, N SFUs 752 that perform special functions (e.g., copy rectangle, pixel blending operations, and the like), and P LSUs 753 that implement load and store operations between the shared memory/L1 cache 770 and the register file 720. In one embodiment, the SM 650 includes 64 DPUs 751, 32 SFUs 752, and 32 LSUs 753.

Each SM 650 includes an interconnect network 780 that connects each of the functional units to the register file 720 and the shared memory/L1 cache 770. In one embodiment, the interconnect network 780 is a crossbar that can be configured to connect any of the functional units to any of the registers in the register file 720 or the memory locations in shared memory/L1 cache 770.

In one embodiment, the SM 650 is implemented within a GPU. In such an embodiment, the SM 650 comprises J texture units 790. The texture units 790 are configured to load texture maps (i.e., a 2D array of texels) from the memory 604 and sample the texture maps to produce sampled texture values for use in shader programs. The texture units 790 implement texture operations such as anti-abasing operations using mipmaps (i.e., texture maps of varying levels of detail). In one embodiment, the SM 650 includes 16 texture units 790.

The PPU 600 described above may be configured to perform highly parallel computations much faster than conventional CPUs. Parallel computing has advantages in graphics processing, data compression, biometrics, stream processing algorithms, and the like.

Figure 8:
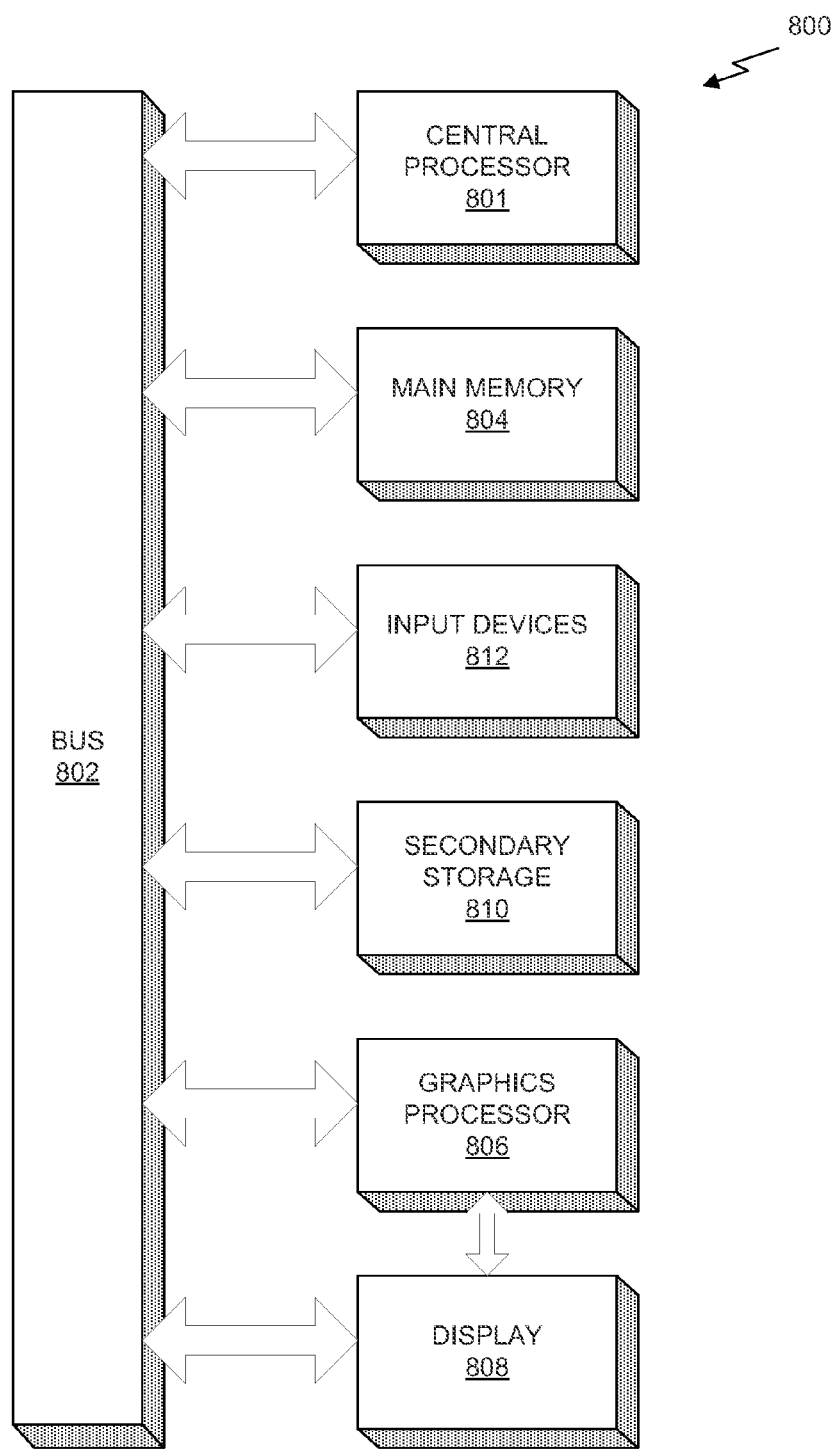
FIG. 8 illustrates an exemplary system in which the various architecture and/or functionality of the various previous embodiments may be implemented.

FIG. 8 illustrates an exemplary system 800 in which the various architecture and/or functionality of the various previous embodiments may be implemented. As shown, a system 800 is provided including at least one central processor 801 that is connected to a communication bus 802. The communication bus 802 may be implemented using any suitable protocol, such as PCI (Peripheral Component Interconnect), PCI-Express, AGP (Accelerated Graphics Port), HyperTransport, or any other bus or point-to-point communication protocol(s). The system 800 also includes a main memory 804. Control logic (software) and data are stored in the main memory 804 which may take the form of random access memory (RAM).

The system 800 also includes input devices 812, a graphics processor 806, and a display 808, i.e. a conventional CRT (cathode ray tube), LCD (liquid crystal display), LED (light emitting diode), plasma display or the like. User input may be received from the input devices 812, e.g., keyboard, mouse, touchpad, microphone, and the like. In one embodiment, the graphics processor 806 may include a plurality of shader modules, a rasterization module, etc. Each of the foregoing modules may even be situated on a single semiconductor platform to form a graphics processing unit (GPU).

In the present description, a single semiconductor platform may refer to a sole unitary semiconductor-based integrated circuit or chip. It should be noted that the term single semiconductor platform may also refer to multi-chip modules with increased connectivity which simulate on-chip operation, and make substantial improvements over utilizing a conventional central processing unit (CPU) and bus implementation. Of course, the various modules may also be situated separately or in various combinations of semiconductor platforms per the desires of the user.

The system 800 may also include a secondary storage 810. The secondary storage 810 includes, for example, a hard disk drive and/or a removable storage drive, representing a floppy disk drive, a magnetic tape drive, a compact disk drive, digital versatile disk (DVD) drive, recording device, universal serial bus (USB) flash memory. The removable storage drive reads from and/or writes to a removable storage unit in a well-known manner.

Computer programs, or computer control logic algorithms, may be stored in the main memory 804 and/or the secondary storage 810. Such computer programs, when executed, enable the system 800 to perform various functions. The memory 804, the storage 810, and/or any other storage are possible examples of computer-readable media.

In one embodiment, the architecture and/or functionality of the various previous figures may be implemented in the context of the central processor 801, the graphics processor 806, an integrated circuit (not shown) that is capable of at least a portion of the capabilities of both the central processor 801 and the graphics processor 806, a chipset (i.e., a group of integrated circuits designed to work and sold as a unit for performing related functions, etc.), and/or any other integrated circuit for that matter.

Still yet, the architecture and/or functionality of the various previous figures may be implemented in the context of a general computer system, a circuit board system, a game console system dedicated for entertainment purposes, an application-specific system, and/or any other desired system. For example, the system 800 may take the form of a desktop computer, laptop computer, server, workstation, game consoles, embedded system, and/or any other type of logic. Still yet, the system 800 may take the form of various other devices including, but not limited to a personal digital assistant (PDA) device, a mobile phone device, a television, etc.

Further, while not shown, the system 800 may be coupled to a network (e.g., a telecommunications network, local area network (LAN), wireless network, wide area network (WAN) such as the Internet, peer-to-peer network, cable network, or the like) for communication purposes.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method comprising:
capturing image sensor data from an interleaved image sensor that includes a first portion of pixels exposed for a first exposure time and a second portion of pixels exposed for a second exposure time that is less than the first exposure time by:
resetting the pixels in the first portion at a first reset time,
resetting the pixels in the second portion at a second reset time, and
sampling the pixels in the first portion and the second portion after a sampling time has elapsed since the first reset time;
receiving the image sensor data from the interleaved image sensor;
identifying a first subset of pixels in the second portion having an intensity value above a first threshold value;
identifying a second subset of pixels in the first portion having an intensity value below a second threshold value; and
generating high-dynamic range (HDR) data based on the first subset and the second subset,
wherein the difference between the sampling time and the first reset time is equal to the first exposure time and the difference between the sampling time and the second reset time is equal to the second exposure time.

2. The method of claim 1, wherein the interleaved image sensor includes a Bayer pattern color filter array arranged in a plurality of quad rows, and wherein the first portion comprises odd quad rows of the interleaved image sensor and the second portion comprises even quad rows of the interleaved image sensor.

3. The method of claim 1, wherein identifying the first subset of pixels in the second portion comprises generating a first mask that identifies the pixels in the second portion that have an intensity value greater than the first threshold value, and wherein identifying the second subset of pixels in the first portion comprises generating a second mask that identifies the pixels in the first portion that have an intensity value less than the second threshold value.

4. The method of claim 1, wherein generating high-dynamic range data comprises generating an intensity value for each pixel in the HDR data by:
  determining whether a corresponding pixel associated with an index for the pixel is included in the first portion or the second portion; and
  if the corresponding pixel is included in the first portion, then:
    determining whether a neighboring pixel of the corresponding pixel is included in the first subset, and
    if the neighboring pixel is included in the first subset, then generating the intensity value for the pixel by filtering one or more sampled values in the second portion, or
    if the neighboring pixel is not included in the first subset, then generating the intensity value for the pixel by selecting the intensity value for the corresponding pixel; or
  if the corresponding pixel is included in the second portion, then:
    determining whether the neighboring pixel is included in the second subset, and
    if the neighboring pixel is included in the second subset, then generating the intensity value for the pixel by filtering one or more sampled values in the first portion to generate a filtered value and scaling the filtered value, or
    if the neighboring pixel is not included in the second subset, then generating the intensity value for the pixel by scaling the intensity value for the corresponding pixel by an exposure ratio.

5. The method of claim 4, wherein determining whether the neighboring pixel is included in the first subset comprises sampling a first mask, and wherein determining whether the neighboring pixel is included in the second subset comprises sampling a second mask.

6. The method of claim 5, wherein the first mask is generated by performing a comparison operation between the intensity level of the neighboring pixel and the first threshold value, and wherein the second mask is generated by performing a comparison operation between the intensity level of the neighboring pixel and the second threshold value.

7. The method of claim 4, wherein filtering comprises performing a linear interpolation between two sampled values.

8. The method of claim 4, wherein filtering comprises taking a weighted sum of a plurality of sampled values.

9. The method of claim 4, wherein filtering is combined with demosaic processing that is based on the weighted sum of a plurality of sampled values.

10. The method of claim 1, further comprising modifying the HDR data by companding the HDR data.

11. The method of claim 10, further comprising transmitting the modified HDR data to an image signal processor that is configured to perform at least one of the functions of noise reduction, demosaicing, color conversion, and gamma correction.

12. The method of claim 1, further comprising:
  identifying a third subset of pixels in the second portion having an intensity value above a third threshold value and below the first threshold value;
  identifying a fourth subset of pixels in the first portion having an intensity value below a fourth threshold value and above a second threshold value;
  determining that a neighboring pixel is included in the third subset, then blending a first intensity value for the pixel generated by filtering one or more values in the second portion with a second intensity value for the pixel generated by selecting the intensity value for a corresponding pixel; and
  determining that a neighboring pixel is included in the fourth subset, then blending a third intensity value for the pixel by filtering one or more values in the first portion with a fourth intensity value for the pixel generated by scaling the intensity value for the corresponding pixel by an exposure ratio.

13. The method of claim 12, wherein blending comprises performing a linear interpolation based on the intensity value of the neighboring pixel.

14. A non-transitory computer-readable storage medium storing instructions that, when executed by a processor, cause the processor to perform steps comprising:
  capturing image sensor data from an interleaved image sensor that includes a first portion of pixels exposed for a first exposure time and a second portion of pixels exposed for a second exposure time that is less than the first exposure time by:
    resetting the pixels in the first portion at a first reset time,
    resetting the pixels in the second portion at a second reset time, and
    sampling the pixels in the first portion and the second portion after a sampling time has elapsed since the first reset time;
  receiving the image sensor data from the interleaved image sensor;
  identifying a first subset of pixels in the second portion having an intensity value above a first threshold value;
  identifying a second subset of pixels in the first portion having an intensity value below a second threshold value; and
  generating high-dynamic range (HDR) data based on the first subset and the second subset,
  wherein the difference between the sampling time and the first reset time is equal to the first exposure time and the difference between the sampling time and the second reset time is equal to the second exposure time.

15. The non-transitory computer-readable storage medium of claim 14, wherein generating high-dynamic range data comprises generating an intensity value for each pixel in an HDR image by:
  determining whether a corresponding pixel associated with an index for the pixel is included in the first portion or the second portion; and
  if the corresponding pixel is included in the first portion, then:
    determining whether a neighboring pixel of the corresponding pixel is included in the first subset, and if the neighboring pixel is included in the first subset, then generating the intensity value for the pixel by filtering one or more values in the second portion, or if the neighboring pixel is not included in the first subset, then generating the intensity value for the pixel by scaling the intensity value for the corresponding pixel by an exposure ratio; or if the corresponding pixel is included in the second portion, then:

determining whether the neighboring pixel is included in the second subset, and if the neighboring pixel is included in the second subset, then generating the intensity value for the pixel by filtering one or more values in the first portion, or if the neighboring pixel is not included in the second subset, then generating the intensity value for the pixel by selecting the intensity value for the corresponding pixel.

16. The non-transitory computer-readable storage medium of claim 15, wherein filtering comprises performing a linear interpolation between two sampled values.

17. A system, comprising:

an interleaved image sensor that includes a first portion of pixels exposed for a first exposure time and a second portion of pixels exposed for a second exposure time that is less than the first exposure time, the interleaved image sensor configured to capture image sensor data by:

resetting the pixels in the first portion at a first reset time, resetting the pixels in the second portion at a second reset time, and sampling the pixels in the first portion and the second portion after a sampling time has elapsed since the first reset time; and an image processing pipeline coupled to the interleaved image sensor and configured to:

receive the image sensor data from the interleaved image sensor, identify a first subset of pixels in the second portion having an intensity value above a first threshold value, identify a second subset of pixels in the first portion having an intensity value below a second threshold value, and generate high-dynamic range (HDR) data based on the first subset and the second subset, wherein the difference between the sampling time and the first reset time is equal to the first exposure time and the difference between the sampling time and the second reset time is equal to the second exposure time.

18. The system of claim 17, wherein generating high-dynamic range data comprises generating an intensity value for each pixel in an HDR image by:

determining whether a corresponding pixel associated with an index for the pixel is included in the first portion or the second portion; and if the corresponding pixel is included in the first portion, then:

determining whether a neighboring pixel of the corresponding pixel is included in the first subset, and if the neighboring pixel is included in the first subset, then generating the intensity value for the pixel by filtering one or more values in the second portion, or if the neighboring pixel is not included in the first subset, then generating the intensity value for the pixel by scaling the intensity value for the corresponding pixel by an exposure ratio; or if the corresponding pixel is included in the second portion, then:

determining whether the neighboring pixel is included in the second subset, and if the neighboring pixel is included in the second subset, then generating the intensity value for the pixel by filtering one or more values in the first portion, or if the neighboring pixel is not included in the second subset, then generating the intensity value for the pixel by selecting the intensity value for the corresponding pixel.

19. The system of claim 17, wherein the image processing pipeline is implemented as a shader program configured to be executed by a graphics processing unit (GPU).

* * * * *